May 14, 1935.   P. N. PETERS   2,001,155
RAZOR BLADE
Filed June 21, 1934   3 Sheets-Sheet 1
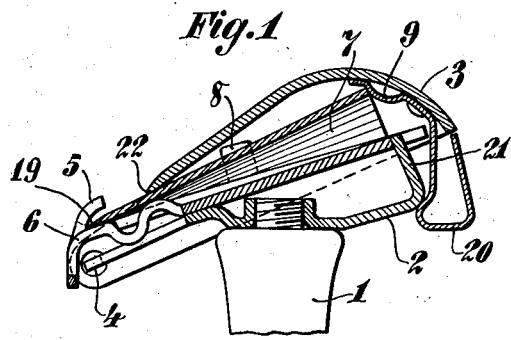
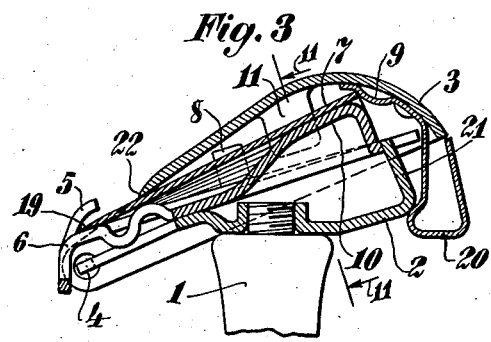
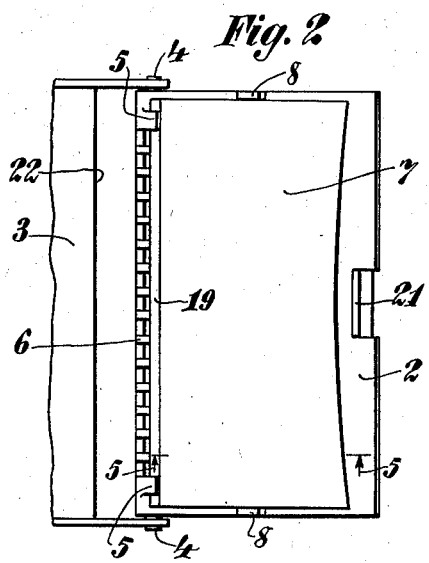
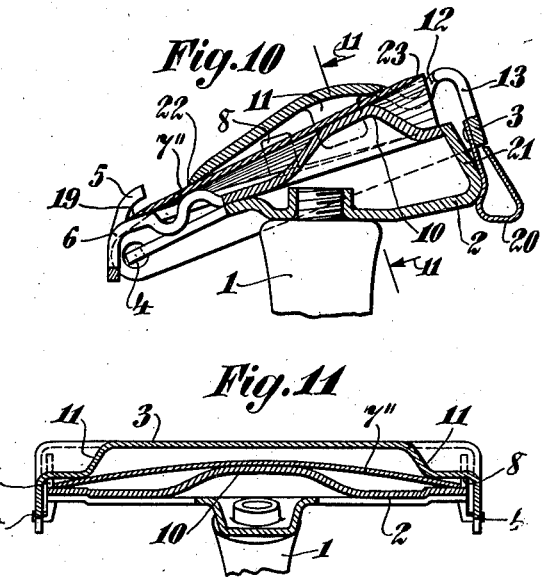
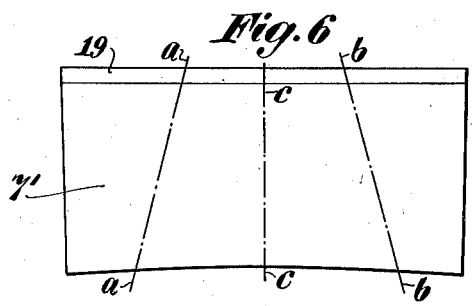
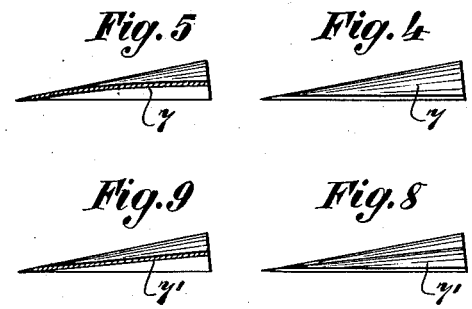
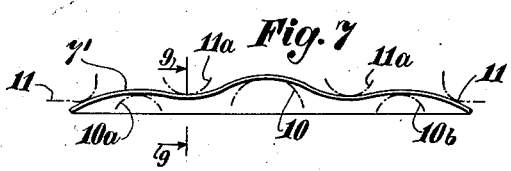
INVENTOR:
Peter Nicholas Peters,
BY
Alexander Chessin
HIS ATTORNEY May 14, 1935.  P. N. PETERS  2,001,155
RAZOR BLADE
Filed June 21, 1934  3 Sheets-Sheet 2
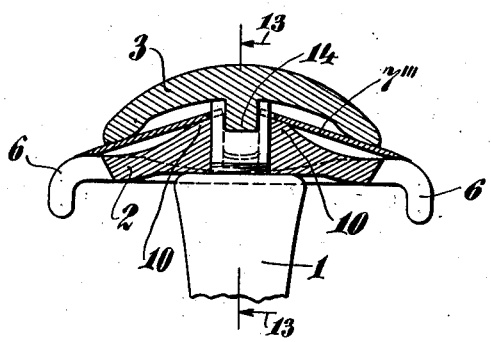
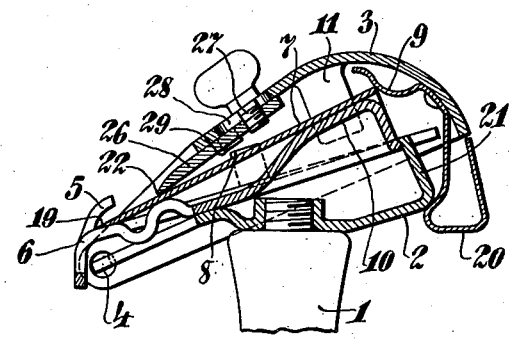
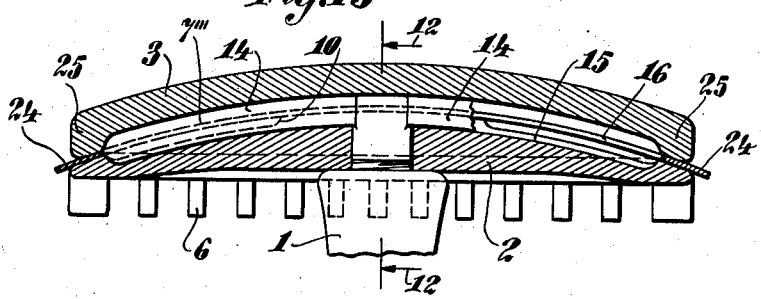
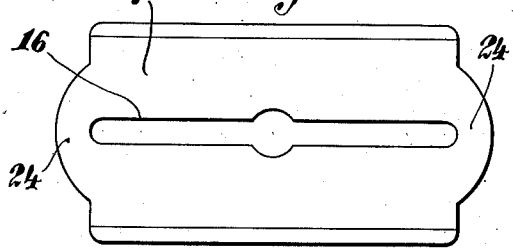
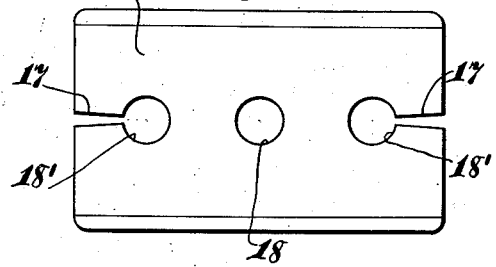
INVENTOR:
Peter Nicholas Peters,
BY
Alexander Chessin
HIS ATTORNEY May 14, 1935.   P. N. PETERS   2,001,155
RAZOR BLADE
Filed June 21, 1934   3 Sheets-Sheet 3
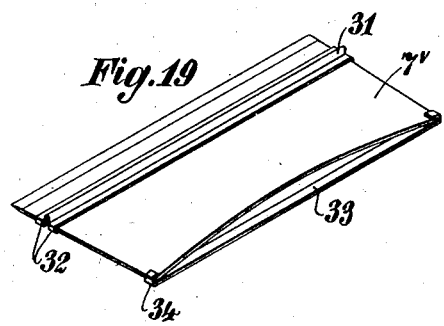
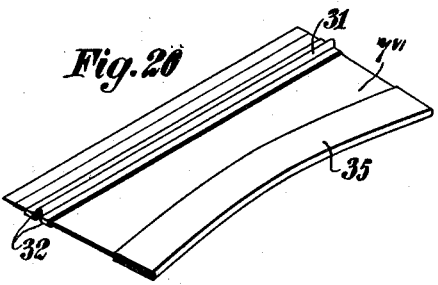
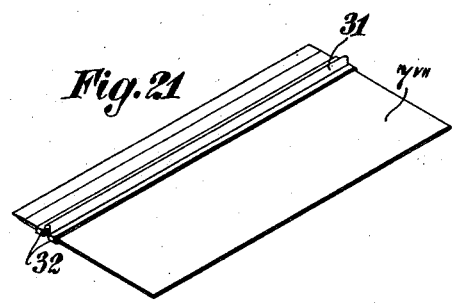
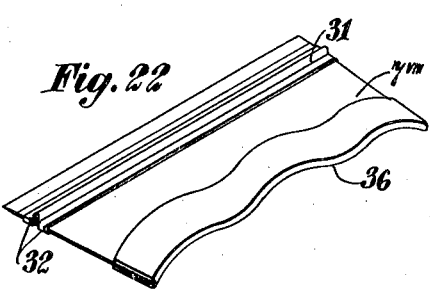
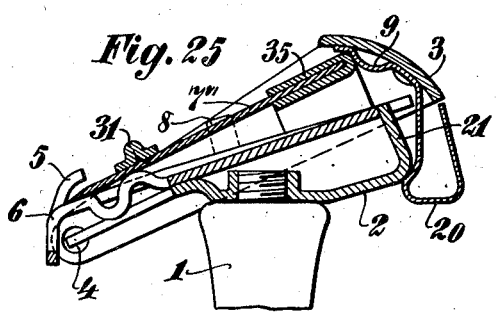
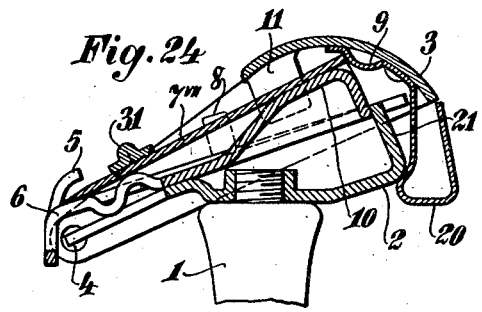
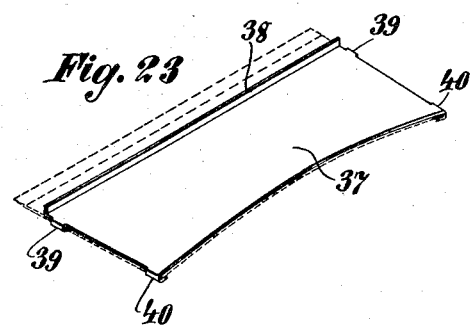
INVENTOR:
Peter Nicholas Peters,
BY Alexander Chessin
his ATTORNEY Patented May 14, 1935

2,001,155

UNITED STATES PATENT OFFICE 2,001,155

RAZOR BLADE

Peter Nicholas Peters, New York, N. Y.

Application June 21, 1934, Serial No. 731,585

22 Claims. (Cl. 30—12)

This invention relates to methods of stiffening the cutting edges of thin, elastic blades and, more particularly, to the methods of stiffening the cutting edges of safety razor blades.

While safety razors have certain well recognized advantages over the type of razor used by barbers (the hollow ground blade), insofar as shaving comfort is concerned the barber's razor is still supreme. This is due to the rigidity of its cutting edge which is free from the vibrations to which the wafer type of blade is subject. Many efforts have been made to endow cutting edges of a wafer blade with greater rigidity which to some extent reduce, if they do not entirely eliminate, the disparity in shaving comfort between the two types of razors. These efforts may be broadly divided into two groups. One group covers various forms of curvature which a normally flat blade is caused to assume when placed in its holder. The other group comprises methods of putting the cutting edge under longitudinal tension without bending the blade.

The method involved in the present invention differs from either of the above mentioned groups and is an improvement on both of them. In order to better grasp the underlying principles, a few words epitomizing prior efforts may not be amiss.

That a flexed blade offers more resistance to vibration than a flat one is a well known fact. It suffices to point out that the thickness of the blade in the curved (Gillette) type of safety razor need not exceed .006", whereas a thickness of at least .009" is required in standard safety razors of the "flat" type to avoid excessive vibration. The art discloses a great variety of curved forms which a normally flat blade is caused to assume when placed in its holder. When a normally flat blade is thus flexed, certain stresses are created therein, some of which have a beneficial effect, while some are injurious to the blade, but all of which tend to more or less reduce vibrations. This method of stiffening the cutting edge requires a tight clamping of the blade.

Conspicuous in the second group of methods for stiffening the cutting edge of a safety razor blade is the use of a pre-formed, "domed", or "dished" blade, i. e., a blade with one or more bulging portions, or "domes", preferably arranged in a row parallel to the cutting edge. When such a blade is compressed between the jaws of the blade clamping mechanism, the pressure upon the bulging "domes" creates, among other stresses, a longitudinal tension which is transmitted, although in a reduced degree, to the cutting edge, thereby giving this edge increased rigidity and resistance to vibration. This method, however, is not adapted to standard processes of manufacture and requires special machinery for sharpening the blades. In the same group belong the methods of stretching the blade in its holder to produce longitudinal tension. Here again, as in the case of "domed" blades, the longitudinal tension is not developed directly at the cutting edge but is transmitted thereto considerably reduced in degree.

The present invention differs from the devices comprised in the first above mentioned group in that further stresses, including additional tension, are superimposed upon the stresses caused by the flexing of the blade, the additional tension being effected by flattening out the marginal portion of the blade containing the cutting edge. The difference between the present method and the methods comprised in the second above mentioned group is that the blade is not preformed with bulging portions but is normally flat, and that the longitudinal tension is developed directly at the cutting edge, like the tension in a taut string under pull, instead of being only partly transmitted.

The following objectives have been successfully attained by the present invention:

The rigidity of the cutting edge of a wafer blade and its resistance to vibration are increased. This increased rigidity and greater resistance to vibration is accomplished by creating longitudinal tension along the cutting edge, or by increasing such tension when it has already been created by other means.

A blade has been produced which in itself embodies these characteristics of increased rigidity of the cutting edge and greater resistance to vibration.

The efficiency of the blade is either independent of the blade holding device, or, if made dependent upon it, remains high within wide limits of the degree of tightness with which the blade is clamped in its holder.

The tolerances of the mechanism for holding the blade need not be held within close limits.

Blades of widely differing thicknesses may be used in the same holder.

The longitudinal tension developed in the blade is maximum at the cutting edge, i. e., where it contributes most towards the elimination of vibration.

No changes in standard manufacturing processes are required to put the present invention in operation.

Other objectives and advantages of the present invention will become apparent from its description, which follows:

In the drawings, Fig. 1 is a cross-section of the clamping mechanism of a blade holder showing the blade in operative position in accordance with the present invention.

Fig. 2 is a top view of the same clamping mechanism, with the upper jaw (shown only partly) turned about its pivots, to an open position.

Fig. 3 is a vertical cross-section similar to the one shown in Fig. 1, but for another form of the invention.

Fig. 4 is a side view of the blade shown in either Fig. 1 or Fig. 3.

Fig. 5 is a cross-section of the blade taken along the line 5—5 of Fig. 2.

Fig. 6 is a top view of a blade flexed in accordance with the present invention about a multiplicity of axes transverse to the cutting edge, and flattened out at the cutting edge.

Fig. 7 is a view of the blade shown on Fig. 6, from the end opposite to the cutting edge.

Fig. 8 is a side view of the same blade, and Fig. 9 is a cross-section thereof taken along the the line 9—9 of Fig. 7.

Fig. 10 is a cross-section of the clamping device of a holder for a modified form of the present invention showing a double edge blade in operative position, one edge being flattened and the other curved.

Fig. 11 is a cross-section of the device shown in Fig. 10 taken along the line 11—11.

Fig. 12 is a cross-section of a safety razor of a form similar to a conventional type for use with a double edge blade, with the blade in operative position in accordance with the present invention.

Fig. 13 is a cross-section of the device shown in Fig. 12 taken along the line 13—13.

Fig. 14 is a top view of the blade shown in Figs. 12 and 13.

Fig. 15 is a front view of the same blade.

Fig. 16 is a cross-sectional view of the same blade taken along the line 16—16 of Fig. 15.

Fig. 17 is a top view of a blade to be used with a holder similar to the one shown in Figs. 12 and 13, but having different positioning means.

Fig. 18 is a cross-sectional view of a modification of the device shown in Fig. 3, this modification including regulation of the clamping means.

Fig. 19 is a top view of a blade which embodies the characteristic features of the present invention.

Fig. 20 is a top view of another embodiment of the present invention.

Fig. 21 is a top view of a blade similar to the one shown in Fig. 19, but prior to flexing it.

Fig. 22 is a top view of still another embodiment of the present invention.

Fig. 23 is a top view of a supporting member for the blade, designed to give the blade the form of a scoop.

Fig. 24 is a vertical cross-sectional view of a holder for a blade such as is shown in Fig. 21. The device is similar to the one shown in Fig. 3, except that the upper jaw, having no clamping function, does not extend to the marginal portion of the blade containing the cutting edge.

Fig. 25 is a similar view of a device for a blade such as is shown in Fig. 20. In this case the upper jaw, having neither a clamping nor a flexing function, is designed without provision for such purposes.

Referring to Figs. 1 and 2 in detail, 1 is a handle of a safety razor provided with a blade clamping device consisting of the lower jaw 2 and the upper jaw 3, hinged together at 4, the handle 1 being screwed into the lower jaw 2 of the clamping device in a familiar manner. The lower jaw 2 of the clamping device is provided with the usual serrations 6 and with a pair of positioning hooks 5 against which rests the blade 7 having a cutting edge 19. The blade 7 is flexed about an axis perpendicular to the cutting edge 19, the blade being made to assume its flexure by resting against the projecting side flanges 8 which are shown in the drawings as being bent out of the material of the lower jaw 2. Except for the form of the flanges 8, the safety razor shown in Fig. 1 is practically identical with a standard type now on the market. In the standard type the side flanges 8 are bent over to hold the blade in a flat position. In the present case, they are used merely as stops, but they may be bent over in such a way as to hold the blade in its curved position. In addition to the above mentioned positioning means, comprising the flanges 8 and the front stops or hooks 5, the clamping device is provided with the spring 9 pressing against the back of the blade 7. The jaws 2 and 3 are held in a closed position by a snap action between the portion 20 of the upper jaw 3 and the portion 21 of the lower jaw 2.

Referring to the Figs. 3 and 11, the clamping device differs from the one shown in Fig. 1 in that the lower jaw 2 is provided with a projecting hump or saddle 10 against which the blade 7 rests in the back and the upper jaw 3 has inwardly projecting portions 11 designed to bear down on the blade 7 to cause it to become flexed about an axis perpendicular to the cutting edge of the blade. The saddle 10 assumes the function of the flanges 8 of the device shown in Fig. 1, i. e., it forces the blade to assume its curvature, the flanges 8 in this modification serving merely for the preliminary positioning of the blade prior to flexing it. Owing to this difference in the function of the flanges 8 in the two illustrations, the flanges 8 are spaced further apart in the Fig. 3 than they are in Fig. 1. When the jaws of the clamping devices shown in either Fig. 1 or Fig. 3 are clamped together pressure is exerted on the marginal portion of the blade containing the cutting edge along a line 22 parallel to the cutting edge. This pressure acts to flatten out the marginal portion.

In the modification shown in Fig. 3, wherein the flanges 8 do not cause curvature of the blade as in the case of Fig. 1, the necessary flexing of the blade is produced by the pressure thereon of the inwardly projecting portions 11 of the upper jaw 3. Whether the flexing of the blade precedes the flattening of the marginal portion containing the cutting edge, or is simultaneous therewith, or the pressure on the marginal portion is exerted before the flexing of the blade takes place, depends, of course, on the construction and design of the clamping jaws. Insofar as the results are concerned, any one of the indicated three procedures may be followed with equally good effect.

The jaws are preferably so designed as to avoid complete flattening out of the marginal portion containing the cutting edge. There is, of course, a definite pressure and point of application of such pressure, in each case, for which the desired effect is maximum, but variations within considerable limits will not greatly affect the results.

Referring to Figs. 6 and 7, the blade 7' is given an undulating form, instead of the single flexure shown in Figs. 1, 2 and 3, when placed between the jaws of the clamping device of the holder. For this modification, it is preferable to use the arrangement shown in Figs. 3 and 11, except that the hump or saddle 10 would have to be changed correspondingly into the three humps 10, 10a, 10b, and instead of a single pair of inwardly projecting portions 11, the upper jaw 3 would have to have two pairs of such projection, 11, 11a, corresponding to the undulations of the blade. The dash-dotted lines a—a, b—b and c—c are the axes about which the blade is flexed.

Referring to Fig. 10, the blade 7'' has a plain edge, as in Figs. 1 and 3, provided for in a like manner; in addition, it has a curved cutting edge 23 on the side opposite to the cutting edge 19, which protrudes through an opening 12 in the upper jaw 3. The upper jaw 3 in this case is provided with serrations 13 to serve as a guard for the curved cutting edge 23. The flexing of the blade is effected by the same means as in Fig. 3. The positioning spring 9 is omitted in this modification because the interaction of the stops 5 and of the inwardly projecting portions 11 is such as to retain the blade firmly in its position. It may be noted that the same is true of the arrangement shown on Fig. 3, i. e., it is not essential that the spring 9 be incorporated in that arrangement.

Referring to Figs. 12, 13, 14, 15 and 16, the handle 1 is attached to the clamping device in a well known manner. The clamping device, again, consists of the lower jaw 2, usually referred to as the "guard" in this type of a safety razor, and of the upper jaw 3, usually referred to as the "cap". The blade 7''' has a longitudinal slit 16, the main function of which is the separation of the blade into two halves flexibly hinged together by means of bridges 24 which are preferably annealed. Through the slit 16 passes the rib 14 of the cap 3, serving together with the groove 15 in the guard 2 as conventional positioning means. The lower jaw or guard 2 has a pair of saddles or humps 10 whose function is similar to that explained in connection with Figs. 3 and 10. Each half of the blade 7''' is thus flexed in a manner similar to that shown and explained in connection with Fig. 3, and the marginal portions of the blade containing the two cutting edges are again flattened out by clamping the jaws 2 and 3 together. The function of the inwardly projecting portions 11 of the upper jaw 3 in case of the device shown on Figs. 3 and 11, is now assumed by the ends 25 of the cap 3 which flex the blade 7''' about an axis perpendicular to its cutting edges.

The herein described procedure of stiffening the cutting edges of a double edged blade is equally applicable whether the two halves of the blade are separated by an internal slit 16 and joined together by external hinges 24, or are separated by external slits 17 and are joined together by internal hinges. The slits 17 preferably end in circular holes 18', to prevent splitting. As shown in Fig. 17, the blade calls for different positioning means, namely, the well known three stud arrangement, the hole 18 being for the passage of the threaded stud, and the two holes 18' for the passage of the other two studs.

In Fig. 18, the device differs from the one shown in Fig. 3 in that it is provided with means for varying the pressure and the point or line of application of such pressure by the upper jaw 3 upon the blade 7. A plate 26, the edge 22 of which is parallel to the cutting edge of the blade, is slidable between the wall of the upper jaw 3 and a guide 29. The thumb screw 27 which operates in the slot 28 serves to hold the plate 26 in a fixed position. While by this arrangement it is possible to so adjust the device as to obtain a maximum result in stiffening the cutting edge of the blade, the results are not materially changed within appreciable variations in the position of the plate 26. In other words, the herein described method permits considerable latitude in the degree of tightness with which the blade is held in its operative position. For this reason, in practice, the form of device shown in Figs. 1 and 3, would, probably, be adopted in preference to the more complicated arrangement shown in Fig. 18.

Referring to Fig. 19, a rigid strip 31 rests on the blade 7ᵛ, the strip 31 being shown in the drawing as of T-shaped cross section, with its flanges 32 extended beyond the blade and bent over it. A second strip 33, shorter than the blade and holding it by means of the bent over extensions 34, causes the blade to become flexed about an axis perpendicular to the cutting edge, while the strip 31 holds the marginal portion containing the cutting edge substantially flat. The blade, when not gripped by the strip 33, is flat. It is in that condition that the blade is subjected to sharpening operations. When the blade is flexed as shown, it assumes the form of a scoop, with the cutting edge of the blade as the entering edge of the scoop.

In Fig. 20, the same shape of a scoop is given to the blade, but by slightly different means. The strip 31 is retained, but the flexing of the blade is effected by a double reinforcing strip 35 formed into a rigid arch. In this case, also, and in the similar case illustrated in Fig. 22, wherein the double reinforcing strip 36 is formed into a rigid series of arches, giving the back of the blade an undulating appearance, the blade is flat before the double reinforcing strip is applied to it.

In Fig. 21, the blade is shown provided only with the strip 31, to hold the marginal portion containing the cutting edge flat, while the blade is flexed either in a suitable holder or by means such as are shown in Fig. 19.

In Fig. 23, the rigid, scoop shaped plate 37 is similar in form to the scoop formations illustrated in Figs. 19 and 20, between the strip 31 and the edge of the blade opposite the cutting edge. The blade, indicated on the drawings in dotted lines, is placed underneath the plate 37 and is secured thereto by the ears 39 and 40, which are bent over the blade. The flange 38 serves to increase the rigidity of the plate 37 and to maintain the marginal portion of the blade containing the cutting edge flat.

Referring to the last two figures, 24 and 25, they merely illustrate holders suitable for use in connection with the new blade. Thus, Fig. 24 shows a holder which may be used in connection with the blade 7ᵛᴵᴵ of Fig. 21, the hump 10 on the lower jaw 2 and the cooperating projections 11 on the upper jaw 3 acting, as in the case illustrated in Fig. 3, to flex the blade about on axis perpendicular to the cutting edge, while the marginal portion of the blade containing the cutting edge is held substantially flat by the strip 31. Accordingly, the upper jaw 3 does not extend to the marginal portion of the blade containing the cutting edge, but stops at the projections 11. It is preferable to have the flanges 8 bent into contact with the blade in order to better secure the blade in the holder. By properly positioning the flanges 8, they will not interfere with the passage of the reinforcing strip 31 when the blade is slipped into its operative position.

In Fig. 25, a holder is illustrated which may be used in connection either with the blade 7ᵛ of Fig. 19, or with the blade 7ⱽᴵ of Fig. 20. The blade being already in the desired form, the jaws need have no provision for either flexing the blade or holding the marginal portion containing the cutting edge flat. The holder, therefore, may be similar to the one shown in Fig. 1, omitting all of the upper jaw 3 between the line 22 and the back spring 9. A holder such as is shown in Fig. 3, also, may be used. While the hump 10 in this type of holder is unnecessary, when the holder is used in connection with the blade 7ᵛ or 7ⱽᴵ, the hump serves as an additional means of support for the arched back of the blade. The flanges 8 should be bent into contact with the blade and positioned so as to allow for the passage of the reinforcing strip 31 when the blade is slipped into its operative position.

From the description of the invention given above, it will be seen that the main objectives set forth in the preamble are attained (1) by the production of a blade which in itself embodies the characteristics of increased rigidity of the cutting edge and greater resistance to vibration, and (2) by the development of a method which, when applied to an ordinary blade, endows it with these characteristics. It can not be emphasized too strongly that the blade shown in Figs. 19, 20, 22, is independent of the holder therefor, in so far as the attainment of the increased stiffness of its cutting edge and the greater resistance to vibration are concerned, since these characteristics are inherent in the blade. One could shave with it readily enough without any holder, but, of course, it is much more convenient to use the blade set in a suitable holder. In addition, the holder is usually provided with a safety feature. Such a holder is shown, as an example only, in Figure 25, but it should be understood that it is not the holder which endows the blade with the above described characteristics, the function of the holder being merely to carry the blade for the purpose of a more convenient operation and to provide the usual "safety" feature.

As to the method for imparting the characteristics of the present invention to an ordinary blade, it may be applied independently of the holder, as in the cases illustrated in Figs. 19-23, or it may be made to depend on the design and construction of the holder, as in the cases illustrated in Figs. 1-18. However, emphasis is again laid upon the fact that the method herein set forth may be applied without reference to any holder. In other words, the method is intrinsically independent, and the blade holding devices shown in the drawings merely illustrate convenient ways of putting the method in operation.

The mode of operation will now be explained in the case of Figs. 1-18, by illustrating the procedure in the simplest case where the blade is flexed about a single axis at a right angle to the cutting edge. We may proceed as is indicated in Fig. 1, first flexing the blade into a cylindrical form by holding it between the side flanges 8, and then flattening out the marginal portion of the blade containing the cutting edge by clamping the jaws 2 and 3 together, or we may proceed, as is indicated in Fig. 3, flexing the blade into a cylindrical form and, at the same time, flattening out the base of the cylinder containing the cutting edge, both operations being simultaneously effected by the clamping of the jaws 2 and 3 together. The result is the same in both cases. The pressure of the upper jaw in contact with the flexed blade superimposes additional stresses upon the stresses created by the flexing of the blade, these additional stresses being mainly tensional, at a right angle to the axis of the cylindrical surface into which the blade has been flexed. Thus, a superimposed longitudinal tension parallel to the cutting edge of the blade is created, which increases towards the cutting edge and is maximum at that edge. At the cutting edge, the condition is such as might be produced by a pull at its ends, somewhat similar to the effect of a pull on the ends of a taut string. The blade, in this, its operative position, is of a generally conoidal form which may be best described as a conico-cylindrical shovel-like scoop with the cutting edge of the blade constituting the entering edge of the scoop. The hump (10) on the lower jaw and the co-operating projections (11) on the upper jaw, supporting and fixing the position of the elevated portion of the scoop, add to its rigidity and to the rigidity of the cutting edge.

In view of the definition of the term "conoid" in standard dictionaries either as a body tapering at one end, as, for instance, a paraboloid, or as a body having a surface generated by a straight line and resembling a cone, it is to be understood that only bodies coming within the second definition are considered here.

It is quite within the scope of this invention to give the inner surfaces of the jaws the form of the actual scoop finally assumed by the blade, but I prefer to have the jaws merely define the surface of the scoop at a sufficient number of key points (such as the front and side stops and the humps and corresponding parts of the jaws), to allow more freedom of adjustment to the blade in assuming its final form. Completely shaped scoop surfaces on the jaws, while perfectly feasible, unless they are highly accurate, are apt to give rise to irregular and, possibly, injurious stresses. By defining the scoop surfaces only at certain key points, the danger of creating undesirable stresses because of any inaccuracy of manufacture is avoided.

It has already been mentioned that the flattening out of the marginal portion of the blade containing the cutting edge, preferably, should not be complete. The pressure of the upper jaw upon the blade, and the location of this pressure should be such as to effect neither too much, nor too little flattening out of the marginal portion of the blade. The best results for each design of razor are obtained at a definite pressure and at a definite point or line of application of such pressure which are determined from actual tests, but once the amount and the location of such pressure are determined, variation from these data within reasonable limits will not appreciably affect the efficiency of the device.

The same degree of latitude exists in the matter of other tolerances of the mechanism, which greatly simplifies the manufacturing problem.

The cutting edge of the blades, when in its operative position, does not follow a mathematically exact straight line, but the deviation from such a line is so slight as to be almost imperceptible. However, it may be noted here that a slight curving of the cutting edge, if anything, is of advantage rather than otherwise.

Because of the latitude in the matter of tolerances, blades of various thicknesses may be used in the same holder with equally good results.

The blades being normally flat, no change is necessary in the present day methods of sharpening the cutting edge or edges.

There is no difference in the application of the same general principles to the more complicated cases where the blade is flexed about more than one axis and where the axes are not perpendicular to the cutting edge. The blade, normally, is still flat and may be identical with the blade used in the more simple form. The only difference between the two cases is that several and differently disposed humps on the lower jaw and corresponding projections on the upper jaw replace the single hump 10 and projections 11 of Fig. 3. In the illustration shown in Figs. 6, 7, the flexure or undulation of the blade, before flattening out its marginal portion, is caused about three axes transverse to the cutting edge. These axes may be perpendicular to the cutting edge, or at some other angles with respect thereto. In Fig. 6, the axes are shown as converging towards the cutting edge. The effect, in this particular illustration, is to concentrate longitudinal tension at the middle part of the cutting edge, thereby increasing the rigidity of the edge in this region. Should the axes be made to diverge towards the cutting edge, the increase of rigidity would be at the end portions of the cutting edge.

What has been said above about the edge of a single edge blade applies with equal force to the edges of the double edged blade shown in Figs. 12–15 and to one of the edges of the double edged blade shown in Fig. 10. The latter, with its double purpose holder, has the advantage of supplying two different needs, viz. a straight edge, practically free from vibration, and a stiff curved edge for shaving where a curved edge is preferable.

Passing now to the blade illustrated in Figs. 19–25, the marginal portion containing the cutting edge of the blade is held substantially flat in all cases. The difference is only in the manner of applying the method of flexing the blade. Thus, in Fig. 19, the flexing is effected by drawing the ends of the edge opposite the cutting edge together, while in Figs. 20 and 22 the flexing is accomplished by holding the edge opposite the cutting edge within the arched, rigid, double reinforcing strips 35 and 36. It should be noted that the latter procedure is quite different from that used in the "domed" blades referred to in the preamble. The blades here shown are not pre-formed. There is no "doming" in the present case, nor is the pressure, designed to create longitudinal tension in the blade, exerted on its bulging portion, but practically at the cutting edge.

The points of application of the pressure on the blade may be varied (as in the case illustrated in Fig. 18) by shifting the position of the rigid strip 31. Such shifting will change both the amount of pressure exerted on the marginal portion of the blade, and the points of its application. The line of demarcation between the flattened and the flexed portions of the blade is determined by the strip 31. It will be seen, therefore, that this line of demarcation may be changed at will.

Of course, there is no actual line of division between the comparatively flat and the more flexed portions of the blade, even though the strip 31 defines a line of demarcation, since the curvature of the blade increases continuously and gradually with the distance from the cutting edge. What the shifting of the strip 31 really does is to change the rate at which the curvature increases.

It should be noted also, in view of what has been said above about the desirability of avoiding complete flattening out of the marginal portion containing the cutting edge, that the bent over extensions of the flanges 32 of the strip 31 should not clamp the blade but only grip it firmly, so as to allow for the slight curvature of the blade under the strip 31.

Having fully described my invention and illustrated various embodiments thereof, I claim:

1. The method of increasing the rigidity of a cutting edge of an elastic, flexible blade, which consists in flexing said blade about one or more axes transverse to said cutting edge, and flattening out the marginal portion only of the blade containing said cutting edge.

2. The method of stiffening a cutting edge of an elastic, flexible blade, which consists in flexing said blade about one or more axes perpendicular to said cutting edge, and flattening out the marginal portion of the blade containing said cutting edge.

3. The method of stiffening a cutting edge of an elastic, flexible blade, which consists in flexing said blade in a manner to include said cutting edge in the flexure, and flattening out the marginal portion of the blade containing said cutting edge.

4. The method of increasing the rigidity of a cutting edge of an elastic, flexible blade, which consists in flexing said blade about one or more axes transverse to said cutting edge, and flattening out the marginal portion only of the blade containing said cutting edge by exerting pressure upon the blade at or near said marginal portion.

5. The method of stiffening a cutting edge of an elastic, flexible blade, which consists in flexing said blade about one or more axes perpendicular to said cutting edge, and flattening out the marginal portion of the blade containing said cutting edge by exerting pressure upon the blade along a line parallel to and at or near said marginal portion.

6. The method of stiffening a cutting edge of an elastic, flexible blade, which consists in flexing said blade in a manner to include said cutting edge in the flexure, and flattening out the marginal portion of the blade containing said cutting edge by exerting pressure upon the blade at or near said marginal portion and parallel thereto.

7. The method of stiffening a cutting edge of a normally flat, elastic, flexible blade, which consists in causing said blade to assume the form of a shovel like scoop having said cutting edge for its entering edge and a curvature increasing with the distance from said edge.

8. The method of increasing the rigidity of a cutting edge of a resilient, flexible blade, which consists in first flexing the blade about one or more axes transverse to said cutting edge, and then flattening out the marginal portion only of the blade containing said cutting edge.

9. The method of stiffening a cutting edge of a resilient, flexible blade, which consists in simultaneously flexing the blade about one or more axes transverse to said cutting edge and flattening out the marginal portion only of the blade containing said cutting edge.

10. The method of stiffening a cutting edge of a resilient, flexible blade, which consists in flexing the blade about one or more axes transverse to said cutting edge, while holding only the marginal portion containing said cutting edge substantially flat.

11. A resilient blade formed into a shovel like scoop having a cutting edge of the blade as the entering edge of said scoop, and a curvature increasing with the distance from said cutting edge.

12. A normally flat, resilient blade, entirely flexed about one or more axes transverse to a cutting edge of the blade and having a substantially but not completely flattened marginal portion containing said cutting edge, and a curvature increasing with the distance therefrom.

13. A normally flat, resilient blade entirely flexed about one or more axes perpendicular to a cutting edge of the blade and having a substantially but not completely flattened marginal portion containing said cutting edge.

14. An oblong normally flat, resilient blade entirely flexed about its transverse axis and provided with two cutting edges perpendicular to said axis, said blade having a substantially but not completely flattened marginal portion containing one of said cutting edges and an arched marginal portion containing the other one of said cutting edges.

15. A normally flat, resilient blade flexed about one or more axes transverse to a cutting edge of the blade and having a substantially but not completely flattened marginal portion containing said cutting edge and a curvature increasing with the distance therefrom, the rate of change in said curvature of the blade being subject to variation.

16. The method of stiffening a cutting edge of a normally flat, elastic, flexible blade, which consists in causing said blade to assume the form of a shovel-like scoop defined by a limited number of key points and having said cutting edge for its entering edge.

17. A resilient blade formed into a shovel like scoop defined by a limited number of key points and having a cutting edge of the blade as the entering edge of the scoop, the curvature of the scoop increasing with the distance from said cutting edge.

18. The method of increasing the rigidity of a cutting edge of an elastic flexible blade, which consists in flexing said blade about one or more axes transverse to said cutting edge into a surface defined by a limited number of key points, and flattening out the marginal portion only of the blade containing said cutting edge.

19. The method of increasing the rigidity of a cutting edge of a resilient, flexible blade which consists in first flexing the blade about one or more axes transverse to said cutting edge into a surface defined by a limited number of key points, and then flattening out the marginal portion only of the blade containing said cutting edge.

20. The method of stiffening a cutting edge of a resilient flexible blade, which consists, in simultaneously flexing the blade about one or more axes transverse to said cutting edge into a surface defined by a limited number of key points and flattening out the marginal portion only of the blade containing said cutting edge.

21. The method of increasing the rigidity of a cutting edge of an elastic flexible blade, which consists in flexing said blade about one or more axes transverse to said cutting edge into a surface defined by a limited number of key points, and flattening out the marginal portion only of the blade containing said cutting edge by exerting pressure on the blade at or near said marginal portion.

22. A resilient blade entirely flexed about one or more axes transverse to a cutting edge of the blade and having a substantially but not completely flattened marginal portion containing said cutting edge, the surface of the blade being defined by a limited number of key points and having a curvature increasing with the distance from said cutting edge.

PETER NICHOLAS PETERS.